United States Patent [19]

Penrice

[11] Patent Number: 5,435,873
[45] Date of Patent: Jul. 25, 1995

[54] METHOD AND APPARATUS FOR SIZING A PISTON

[75] Inventor: Thomas J. Penrice, Reading, Pa.

[73] Assignee: DECC Technology Partnership, a limited partnership of which The DECC Company, Inc. is a general partner, Grand Rapids, Mich.

[21] Appl. No.: 152,598

[22] Filed: Nov. 12, 1993

Related U.S. Application Data

[63] Continuation-in-part of Ser. No. 786,772, Nov. 1, 1991, Pat. No. 5,266,142.

[51] Int. Cl.⁶ .............................................. B41F 16/00
[52] U.S. Cl. ................................ 156/240; 92/223; 101/163; 118/264
[58] Field of Search .............. 156/230, 240; 101/41, 101/150, 153, 163, 170, 193; 118/58, 212, 264; 123/193.6; 252/12; 92/223

[56] References Cited

U.S. PATENT DOCUMENTS

| | | | |
|---|---|---|---|
| 1,975,818 | 10/1934 | Work | 204/13 |
| 3,295,198 | 1/1967 | Coan | 29/527 |
| 3,916,784 | 11/1975 | Dubuit | 101/41 |
| 4,060,031 | 11/1977 | Philipp | 101/163 |
| 4,313,982 | 2/1982 | Miura | 427/428 |
| 4,321,308 | 3/1982 | Jahnke | 428/469 |
| 4,395,442 | 7/1983 | Meise et al. | 427/236 |
| 4,545,301 | 10/1985 | Reinhold | 101/163 |
| 4,683,821 | 8/1987 | Berberich | 101/170 |
| 4,723,485 | 2/1988 | Berberich et al. | 101/44 |
| 4,814,204 | 3/1989 | Carey et al. | 427/286 |
| 4,831,977 | 5/1989 | Presswood | 123/193 P |
| 4,832,983 | 5/1989 | Nagatomi et al. | 427/81 |
| 4,871,593 | 10/1989 | McIntyre | 427/428 |
| 4,892,760 | 1/1990 | Nishiyama | 427/428 |
| 4,932,352 | 6/1990 | Huvey et al. | 118/202 |
| 4,986,231 | 1/1991 | Brown | 123/193 P |
| 4,987,014 | 1/1991 | Woodward et al. | 427/278 |
| 4,987,865 | 1/1991 | Schenkel | 123/193 P |
| 4,997,024 | 3/1991 | Cole et al. | 164/75 |

FOREIGN PATENT DOCUMENTS

2163073 2/1986 United Kingdom .

OTHER PUBLICATIONS

Tampoprint Brochure on Tampoprinting Machines, pp. 1–26, Oct. 1987.

*Primary Examiner*—James J. Engel
*Attorney, Agent, or Firm*—Price, Heneveld, Cooper, DeWitt & Litton

[57] ABSTRACT

A method and apparatus for sizing a piston to a defined size outer diameter surface, which is the contact surface with the cylinder of an internal combustion engine. The apparatus method involves first measuring each piston, then calculating the amount of coating required to achieve the desired diameter for each individual piston or range of pistons and then applying a precise coating in either one or more coats preferably by using a rotary pad printing technique to produce the precise film thickness, thus narrowing the diameter range of the group of pistons.

20 Claims, 5 Drawing Sheets

METHOD AND APPARATUS FOR SIZING A PISTON

This invention is a continuation-in-part of U.S. patent application Ser. No. 07/786,772, filed Nov. 1, 1991 (now U.S. Pat. No. 5,266,142, issued Nov. 30, 1993) and entitled COATED PISTON AND METHOD OF COATING THE SAME.

This invention relates to a method and apparatus of sizing a piston to a defined-sized outer diameter surface, which is the contact surface with the cylinder of an internal combustion engine. More specifically, it relates to a process and apparatus of coating such defined surfaces to a selected, specific dimension. In addition, this process can be used to apply coatings of different compositions to differing thickness to different portions of a piston in one operation.

BACKGROUND OF THE INVENTION

It will be appreciated that during the operation of an internal combustion engine having pistons reciprocating in cylinders, that uncombusted gases will pass through the gap between the outer diameter of the piston and the wall of the cylinder. This gap between the piston and cylinder at the head or top land ring area of the piston is generally called crevice volume. It is an accepted fact that a portion of the unburned gases that are allowed to pass into the crevice volume are exhausted from the engine as unburned or partially burned gases, creating undesirable emissions, considered pollutants to the environment. This gap exists partly to accommodate the thermal expansion of the head of the piston (1) in the hottest possible case and (2) the most distorted or unround cylinder of a multi-cylinder engine. This required clearance at the outer diameter of the piston is accentuated by the machining tolerance capability of the piston manufacturer such that the largest potential machined size is normally less than the size required to eliminate touching or seizing in the cylinder in any of the cylinders of a multi-cylinder engine during the hottest operation as predicted in any projected engine operation in any typical climate. This clearance also results in undesirable piston motion occurring during the operation of the engine due to manufacturing tolerances of the piston skirt and the cylinder size allowing the piston to move laterally and rock or tilt in the cylinder, increasing crevice volume.

The only attempts of which I have knowledge to solve the above problem have been to develop techniques for more accurately machining the pistons and cylinders to tighter specific dimensions. However, machining tools wear while machining the pistons, which results in the same tool eventually machining pistons of different diameters. For example, a typical piston with a nominal diameter of 80 mm will be supplied in three "grade" sizes, equating to three diameter ranges. For example:

| Grade | Size Range |
| --- | --- |
| A | 79.976–79.992 mm |
| B | 79.992–80.007 mm |
| C | 80.006–80.016 mm |

This variation in piston sizes leads to a wide variation in piston to bore clearance. To my knowledge there has been no success in solving the above problem.

SUMMARY OF THE INVENTION

U.S. patent application Ser. No. 07/786,772 referred to above, the disclosure of which is incorporated herein, describes a process and apparatus for applying a dry-film lubricant coating to defined areas of a piston and more specifically, the largest exterior surface of the piston referred to as the skirt. As described in patent application Ser. No. 07/786,772, a dry-film lubricant helps to reduce friction and wear. Further, such process applies a coating to a precise thickness and therefore, I conceived of applying a coating to the piston skirt (the guide surface of the piston) such that a much more precise size control is maintained than can be achieved by machining alone. I also conceived that with this approach each piston can be measured and a process used such that a predetermined thickness of coating be applied to each piston to bring the final coated size of the diameter of the piston skirt to a predetermined level. This allows the piston to be more stable, and more completely fill the cylinder. Further, I conceived a controlled thickness coating which can be applied to the top land ring of the piston, thus reducing the crevice volume for the relationship between the piston and the individual cylinder it acts in. This land coating may be compressible and abradable such that contact with the cylinder will not lead to failure of the operation of the piston or cylinder. Furthermore, the top land ring usually has an outer diameter significantly less than the skirt area, to allow for thermal expansion and manufacturing tolerances. If a top land ring is coated to the appropriate thickness with a compressible and/or abradable coating, the gap at this area would be severely reduced as well. This increase of the land ring diameter, through the addition of one or more layers of coatings would reduce undesirable emissions, including hydrocarbons, discharged by the cylinder.

In accordance with one aspect of this invention the diameter of the area to be coated for each individual piston is required and a calculation is performed to determine the optimal film thickness for each individual piston or each range of pistons and then the precise thickness of coating is applied to each individual piston or range of pistons. In another aspect, different compositions can be applied to different parts of the piston at different times or at the same time.

Thus, the present invention provides for a piston with a diameter of the piston at the skirt to be controlled to a level not possible through present machining techniques. It provides for this precise diameter by first measuring the piston, then calculating the amount of coating required to achieve the desired diameter for each individual piston or range of pistons, then applying the coating by using a rotary pad printing technique to produce the precise film thickness. I have discovered that dry-film lubricant coatings, adjusted with solvent to the appropriate viscosity and evaporation rate and other mechanical techniques can be applied with this method to a film thickness range of 2 to over 25 microns per print in a statistically confident manner. In addition, more than one section of the piston can be coated with different thickness coatings and with layers of coatings of different compositions as needed to function as desired in the cylinder.

Figure 1:
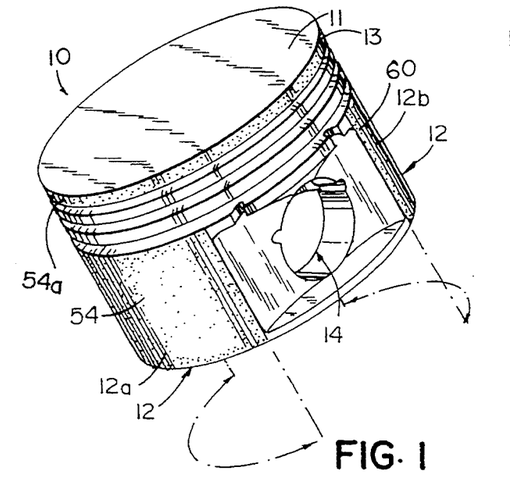
FIG. 1 is a perspective view of a piston with a skirt coated with a dry-film lubricant and a top land ring coated with a compressible and/or abradable coating preferably using the multi-stage pad printing process of this invention.
Figure 2:
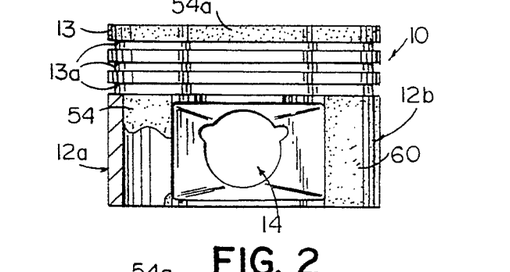
FIG. 2 is a side-elevational view of the piston of FIG. 1.
Figure 3:
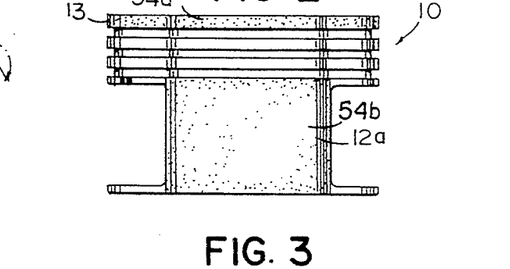
FIG. 3 is a side-elevational view of FIG. 2 rotated 90°.

Referring now to the drawings and the embodiments illustrated therein, in which like numerals indicate like parts throughout the several views, FIGS. 1, 2, and 3 disclose the piston 10 of this invention which is provided with a crown 11 and an outer curved surface area comprising the piston skirt 12 and a ring band including the top land ring 13, both of which are subjected to frictional contact with the inner surface of a cylinder (not shown). Between the top land ring 13 and the skirt 12 the ring band has grooves 13a for receiving piston rings (not shown). Piston skirt 12 has two curved surface areas 12a and 12b which are diametrically opposite from one another. Piston 10 also has a pair of diametrically opposite wrist pin openings 14. The top land ring 13 usually has an outer diameter less than the diameter of the skirt 12 to allow for thermal expansion and manufacturing tolerances. In accordance with this invention, this skirt 12 and/or the top land ring 13 are coated with one or more layers of appropriate material to obtain a precise diameter that cannot be achieved by machining alone.

The material to be applied to the skirt 12 is a wetted, resin-bonded dry-film lubricant such as flouropolymer lubricant or a molybdenum disulfide or graphite, although any combination of dry-film lubricant and resin binder can be modified to be applied by the transfer pad process to a piston through the use of appropriate solvents.

To demonstrate this principal, a mixture of a conventional epoxy resin system (with cross linker and catalyst) was loaded with graphite at a rate ratio of 1:1 by weight and diluted with a 50/50 mixture of diethylene glycol butyl ether and cyclohexanone to a percent solids level of 50%. This material was transferred to a piston skirt using rotary pad printing equipment manufactured by Trans Tech America, Inc. of Carol Stream, Ill.

The thickness of the coating for the skirt is selected by determining the diameter range of the cylinder in which the piston is to be operated and also the diameter of the machined piston. As will be described hereinafter, the coating may comprise one or more layers of the dry lubricant to obtain the desired overall piston size.

As previously stated, the top land ring 13 usually has an outer diameter significantly less than the skirt area diameter to allow for thermal expansion and manufacturing tolerances. This leaves a gap between the piston and cylinder at the top or head of the piston to produce what is called "crevice volume" which allows the unburned gases that are allowed the pass into the crevice volume to be exhausted from the engine creating undesirable emissions. In accordance with this invention, the top land ring 13 is coated to an appropriate thickness with a series of one or more compressible and/or abradable coatings that reduces this gap thereby reducing undesirable emissions. This coating can also be accomplished by one or more layers of coatings as will be described hereinafter.

The material utilized in coating the top land ring 13 can be the same material as described above for the skirt. However, it may be desirable to include in the composition a catalyst to produce better combustion. Also, a thermal conductive material can possibly be used to conduct heat away from the piston to the cylinder. Most importantly, the thermal expansion of the coating must be matched to the thermal expansion of the land ring. To do this at the desired film thickness, a combination of coatings may be required.

Figures 4, 5, 6:
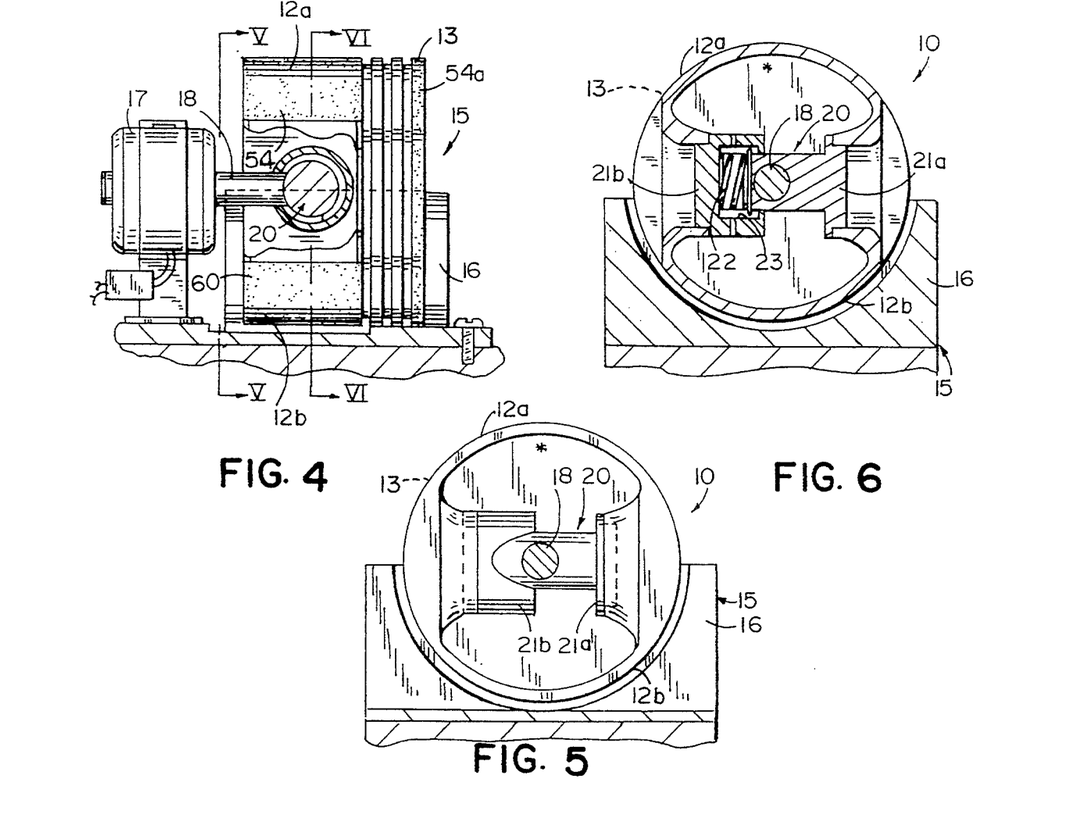
FIG. 4 is a side-elevational view illustrating one apparatus for supporting the piston while it is being coated and for rotating it so that defined areas can be coated.
FIG. 5 is a cross-sectional view taken along the plane V—V of FIG. 4.
FIG. 6 is a cross-sectional view taken along the plane VI—VI of FIG. 4 illustrating the internal construction of the apparatus for supporting and rotating the piston.

FIGS. 4, 5, and 6 illustrate the support mechanism 15 which includes a cradle 16 in which the ring band is supported as the piston 10 is rotated by the motor 17. The piston could be rotated by a gear, which meshes with a gear driving the transfer pad. The piston 10 is connected to the shaft 18 of the motor 17 by a bias plunger 20 which includes two ends 21a and 21b shaped to fit into the wrist pin openings 14a and 14b, respectively. End 21b is shaped so as to receive spring 22 which is seated in the recess 23 of end 21b and contacts the end 21a so as to bias the two ends 21a and 21b apart thereby releasably attaching plunger 20 to the piston 10. By attaching the plunger 20 within wrist pin openings 14, operation of motor 16 will rotate motor shaft 18 and plunger 20 causing rotation of piston 10. Plunger 20 can be released and withdrawn from within wrist pin openings 14 by compressing ends 21a and 21b against the bias of spring 22. A more simple fixture, holding the piston by spring tension, has also been proved acceptable for some piston designs.

FIGS. 7A-7F schematically illustrate the steps of the process of coating a piston by this invention. They disclose in schematic form one embodiment of an apparatus by which the skirt 12 can be coated with the wetted dry-film material as disclosed above. Referring to these figures, piston 10 is shown supported by support mechanism 15 within the cradle 16. as described above in FIGS. 4, 5, and 6. For clarity purposes, motor 17 of FIGS. 4, 5, and 6 (or gear as previously disclosed) is not shown, it being understood that the support mechanism 15 as shown in cross section is disclosed in FIG. 5. Support mechanism 15 and piston 10 are supported in proper position with respect to the tampon transfer machine 30, as will now be described so that the wetted dry-film material can be delivered to piston 10.

Referring to FIGS. 7A-7F, machine 30 includes a fixed machine support 32 having a back support plate 31 and an under support plate 33. Machine support 30 also supports a lubricant reservoir 36 and supports a rotary cylindrical matrix plate 34 containing a matrix 38. Machine support 32 also provides support for a doctor blade 44 which is in continuous contact with cylindrical matrix plate 34. Matrix 38 has a predetermined constant depth in plate 34 which corresponds to the configuration and size of the piston skirts 12a and 12b of piston 10. A rotary cylindrical resilient elastomeric tampon 50 is in continuous contact with matrix plate 34.

Figure 7A:
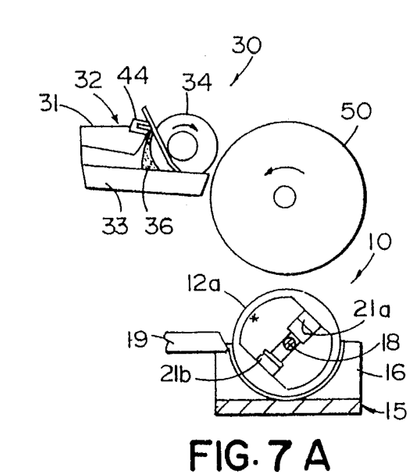
FIGS. 7A—7F are side-elevational views of the apparatus for coating the skirt of a piston.
Figure 7B:
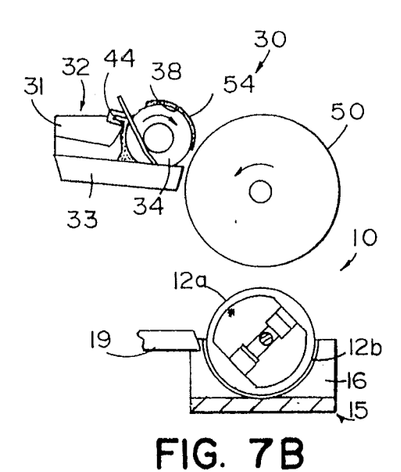
Figure 7C:
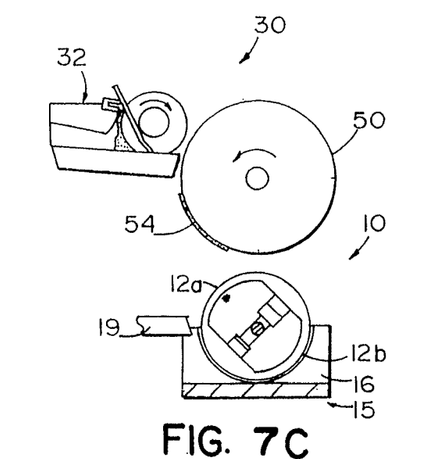

The first step in the operation of machine 30 involves the covering of plate 34 with lubricant from reservoir 36. The rotation of plate 34 through reservoir 36 fills matrix. 38 with lubricant (FIG. 7A). Rotation of plate 34 past doctor blade 44 scrapes excess lubricant away from plate 34 to form a matrix lubricant layer 54 having a constant depth that corresponds to the configuration and size of the flat developed pattern of piston skirts 12a and 12b of piston 10 (FIG. 7B). Tampon 50, which rotates in contact with plate 34, but in the opposite direction, contacts matrix lubricant layer 54 causing some or all of matrix lubricant layer 54 to adhere to tampon 50 to form a lubricant layer 54 (FIG. 7C). Tampon 50 then rotates tampon lubricant layer 54 into position for transfer to piston 10.

Figure 7D:
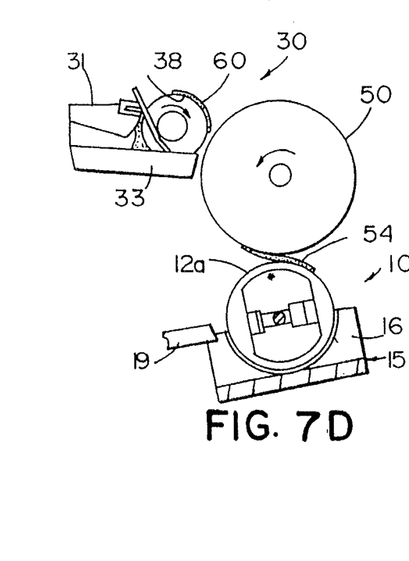

During the rotation of plate 34 and tampon 50 and the transfer of matrix lubricant layer 54 to tampon 50, the movement of support lever 19 moves support mechanism 15 causing piston 10 to contact tampon 50. The rotation of plate 34 and tampon 50 are in timed sequence with the movement of piston 10 by support lever 19 to allow the precise transfer of some or all of tampon lubricant layer 54 from tampon 50 to piston skirt 12a to form a first lubricant film coating 54 (FIG. 7D). Following the formation of first lubricant film coating 54, a second movement by support lever 19 retracts piston 10 from contact with tampon 50.

Figure 7E:
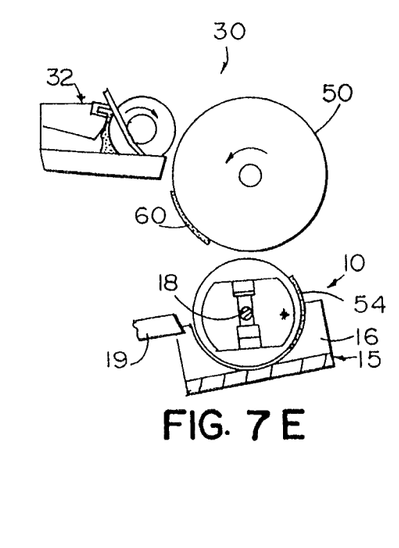
Figure 7F:
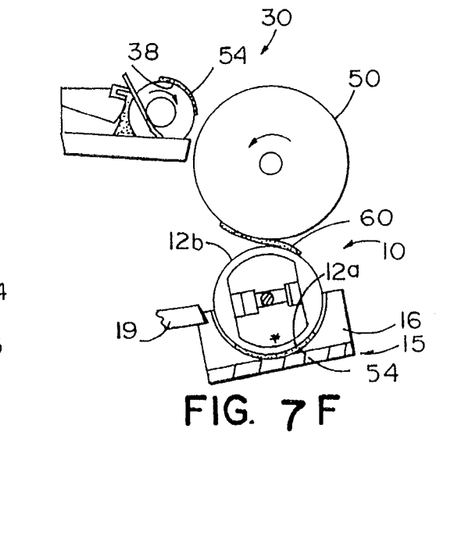
Figure 8A:
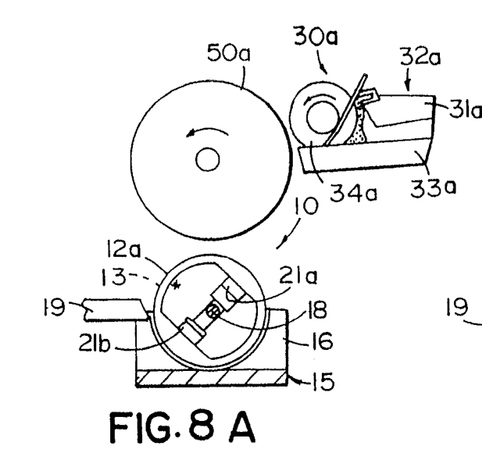
FIGS. 8A and 8F are side-elevational views of apparatus for coating the top land ring of a piston.
Figure 8B:
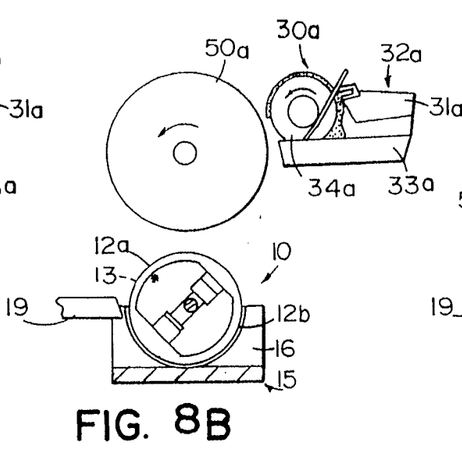
Figure 8C:
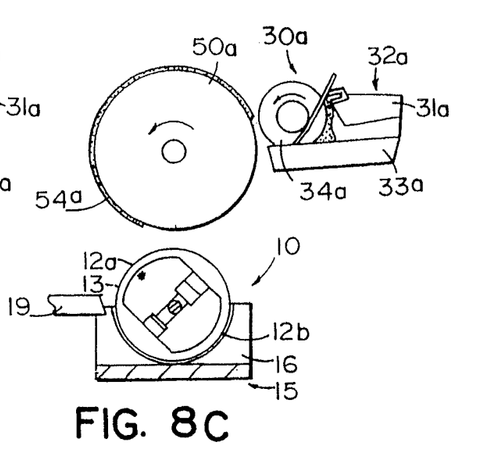
Figure 8D:
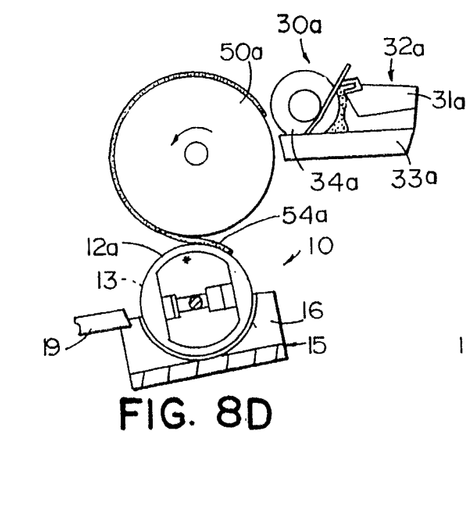
Figure 8E:
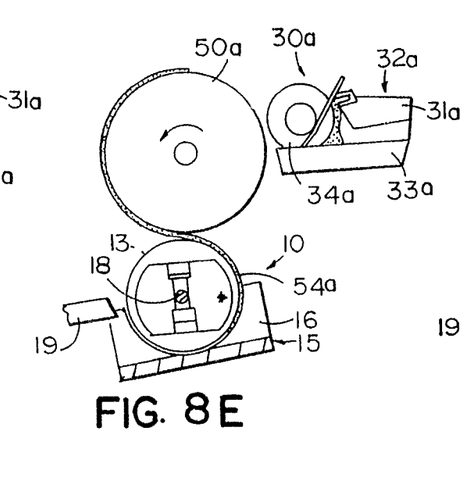

While matrix lubricant layer 54 is being transferred to tampon 50, plate 34 rotates through reservoir 36 again and covers plate 34 with lubricant (FIG. 7C). Doctor blade 44 then scrapes excess lubricant away from plate 34 again to form a second matrix lubricant layer 60 having a constant depth that corresponds to the configuration and size of the flat developed pattern of piston skirts 12a and 12b of piston 10 (FIG. 8D). Tampon 50 contacts second matrix lubricant layer 60 causing second matrix lubricant layer 60 to adhere to tampon 50 (FIG. 7E). Tampon 50 then rotates second tampon lubricant layer 60 into position for application to piston 10.

Figure 8F:
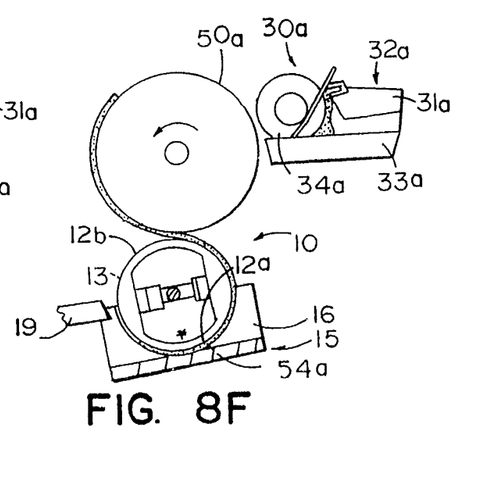
Figure 9A:
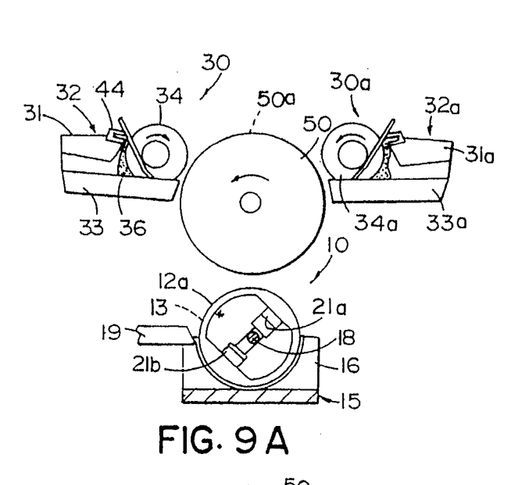
FIGS. 9A—9F are side-elevational views of the apparatus for simultaneously coating the top land ring and the skirt of a piston.
Figure 9B:
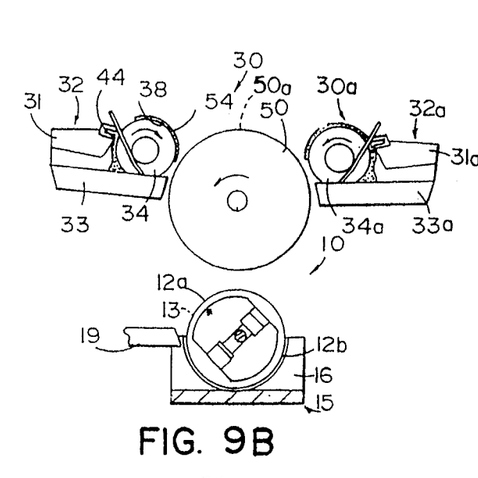
Figure 9C:
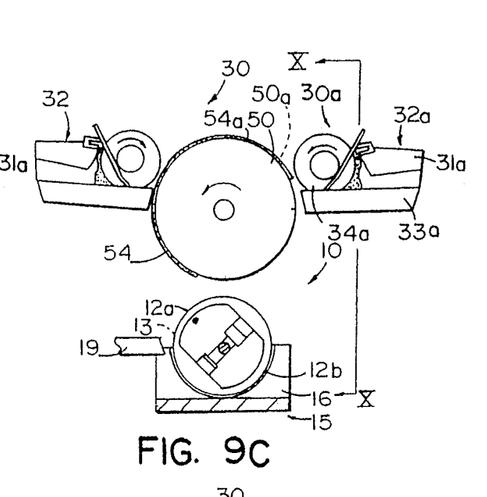
Figure 9D:
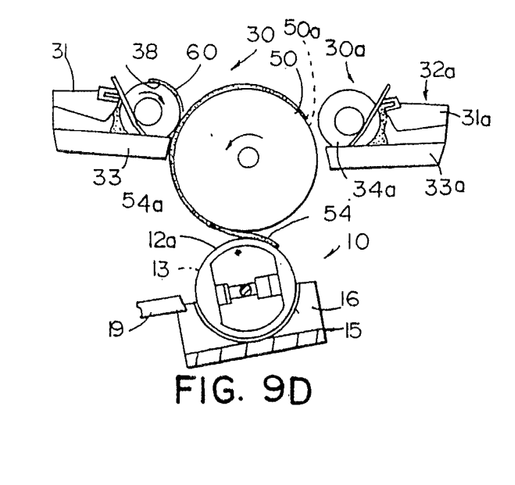
Figure 9E:
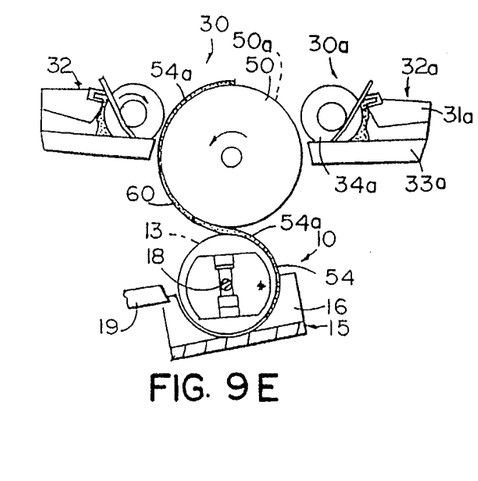
Figure 9F:
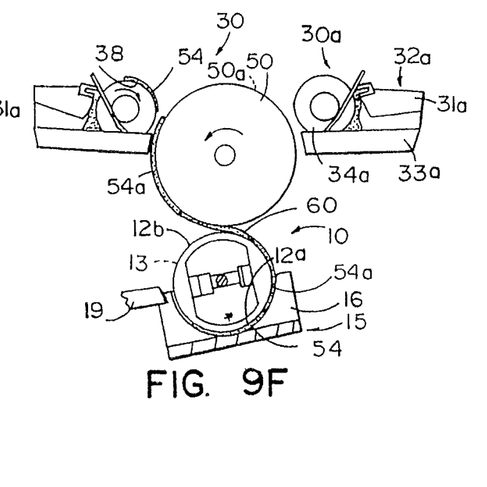
Figure 10:
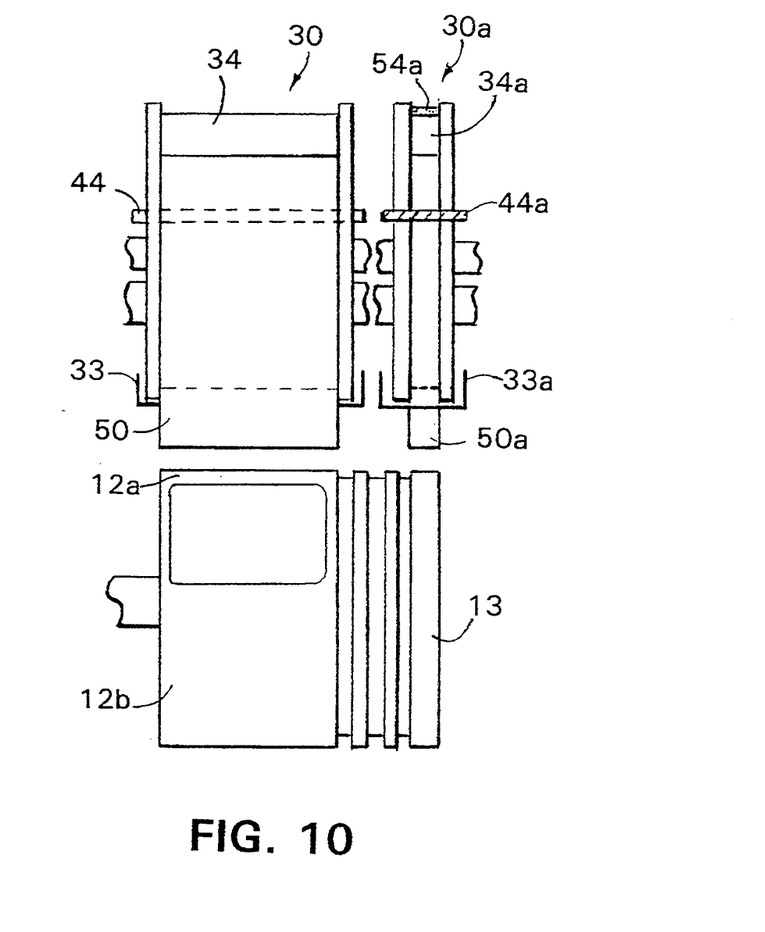
FIG. 10 is a view of the apparatus of FIG. 9 taken along the plane IX—IX of FIG. 9C.

Movement of support lever 19 again moves support mechanism 15 and piston 10 into contact with tampon 50. The rotation of plate 34 and tampon 50 are in timed sequence with the movement of piston 10 by support lever 19 to allow the precise transfer of some or all of the tampon lubricant layer 60 from tampon 50 to piston skirt 12b to form a second lubricant film coating 60 (FIG. 8F). Piston 10 has been rotated 180° to provide access to piston skirt 12b. Following the formation of second lubricant film coating 60, support lever 19 again retracts piston 10 from contact with tampon 50. With the completion of the coating of piston. 10 with lubricant, piston 10 is removed from piston support mechanism 15 and a new piston 10 is placed in position on piston support mechanism 15. In the preferred embodiment, the piston is recoated while still wet to enhance uniformity.

Reference is now made to FIGS. 8A–8F, wherein the apparatus and method of coating the land ring 13 includes a machine 30a substantially identical to the machine 30 of 7A and 7F. As disclosed in FIGS. 8A–8F, machine 30a includes the fixed machine support 32a, back support plate 31a and under support plate 33a, all located on the opposite side of the tampon 50 as is the reservoir 36a, the cylindrical matrix plate 34a containing the matrix 38a and the doctor blade 44a. The matrix 38a of a predetermined constant depth in the plate 34a is continuous along the entire periphery of the plate 34a so that a continuous coating of the land 13 is accomplished. Otherwise, apparatus 30a is substantially identical and operates like that of machine 30 of FIGS. 7A–7B.

During the operation of the machine 30a, the rotation of plate 34a through reservoir 36a fills matrix 38a with a dry film coating (FIG. 7A). Rotation of plate 34a past doctor blade 44a scrapes excess dry film coating away from the plate 34a to form a matrix coating layer 54a having a constant depth. As tampon 50 rotates in contact with plate 34a, but in the opposite direction, it contacts matrix coating layer 54a causing some or all of the layer to adhere to tampon 50 to form a coating layer 54a (FIG. 8C). Tampon 50 then rotates tampon coating layer 54a into position for transfer to piston 10. As disclosed in FIG. 8D, the movement of support lever 19 moves support mechanism 15 causing piston 10 to contact tampon 50. The rotation of plate 34a and tampon 50 in timed sequence with the movement of the piston 10 by support lever 19 allows the precise transfer of some or all of tampon coating 54a from tampon 50 to land ring 13. This continues until the entire land ring 13 has been coated. With the completion of the coating of the land ring 13 of piston 10 with lubricant, piston 10 is removed from the piston support mechanism 15 and a new piston is placed in position on the piston support mechanism 15.

Referring to FIGS. 9A–9F and 10, reference numeral 30 designates the same tampon transfer machine as disclosed in FIG. 7A–7F with all of its parts including the fixed machine support 32, the back support plate 31, the upper support plate 33, lubricant reservoir 36, rotary cylindrical matrix plate 34, and doctor plate 44. In addition, FIGS. 9A–9F disclose the tampon transfer machine 30a of FIGS. 8A–8F for simultaneously applying a coating to the land ring 13. As disclosed in FIGS. 9A–9F and FIG. 10, the tampon transfer machine 30a includes the fixed machine support 32a, back support plate 31, and an under support plate 33. Machine support 32 supports a coating reservoir 36a, the rotary cylindrical matrix plate 34a which contains a matrix 38a which in width corresponds to the width of the land ring 13. The cylindrical matrix plate 34a can be substantially the same diameter as the diameter of the piston so that at every revolution of the matrix plate 34a, one coating will be applied to the ring land 13.

Having described the operations of the tampon transfer machines 30 and 30a, it is not considered necessary to repeat the entire operation of the machines 30 and 30a. Suffice it to say that for every application of a coating at a coating station, a coating may be simultaneously applied to the land ring 13 and/or skirt. The thickness of each of the coatings will depend upon the depth of the matrixes 38 and 38a, respectively. Such simultaneous application is accomplished by the timing of the operation of tampon machines 30 and 30a and the rotation of piston 10.

It should be understood that in accordance with this invention, the sizing of a piston at the skirt area is accomplished by measuring the diameter of a defined area of a piston such as the skirt 12 and having determined the desired diameter dimension of such defined area, such diameter dimension is accomplished by applying a coating, the thickness of which relates to the difference between the desired diameter size and the measured diameter of the piston. For example, a piston with a preferred nominal skirt diameter of 80 mm may have three skirt size grades in millimeters as follows:

| Size | Range |
|---|---|
| A | 79.976–79.992 mm |
| B | 79.992–80.007 mm |
| C | 80.006–80.016 mm |

In these examples, the size range is from 10 to 16 microns. With present technology, single size range pistons will be closer to the 16 micron total range. Since all of the above pistons falling within the above size ranges are acceptable for a given engine, it is evident that the cylinders of the engine are at least 80.016 mm in diameter. Therefore, it would be desirable that each of the pistons be sized to be very close to the typical cylinder diameter. For example, a cylinder for a "B" size piston would typically have a size range of 80.038 to 80.056 mm. Therefore, the range of piston to bore clearance will vary from the extreme of the largest piston in the smallest bore (80.038 mm−80.008 mm=30 microns) to the smallest piston in the largest bore (80.056 mm−79.992 mm=64 microns) or a range of difference of 34 microns. For example, with this invention, the current "B" grade pistons could be sorted into four subgroups, and then coated with different thicknesses, to compress the range of piston sizes and cylinder clearances, as shown below:

| Grade | Diameter Prior to Coating (Millimeters) | Coating Thickness* (Millimeters) | Diameter After Coating (Millimeters) |
|---|---|---|---|
| B1 | 79.992–79.995 | 0.039–0.043 | 79.031–79.038 |
| B2 | 79.996–79.999 | 0.035–0.039 | 79.031–79.038 |
| B3 | 79.000–79.003 | 0.031–0.035 | 79.031–79.038 |
| B4 | 79.004–79.007 | 0.027–0.031 | 79.031–79.038 |

*Cumulative thickness of two sides (skirts) of the piston.

Thus, this invention can reduce the size range from 15 microns to 7 microns, and can reduce the cylinder clearance from a range of 30 to 64 microns to 0 to 24 microns, substantially reducing the opportunity for uncombusted gases to escape as emissions. In accordance with this invention, this desired result can be accomplished by stabilizing the pistons at a standard temperature, which is suggested to be 70° F., and the piston measured by well-known contact measurement instruments such as manufactured by Freeland Gauge Co. of New Hudson, Mich., Moore Products Co. of Spring House, Pa., Omega Engineering of Stamford, Conn., Brunswick Instrument Div. of Niles, Ill., Heidenhain Corp. of Schaumburg, Ill. and Gould Inc. of Valley View, Ohio. After the piston temperature has been stabilized and the size across the skirt has been determined, a calculation is made to determine the coating thickness to be applied to the skirt. The larger size pistons will be coated with a thinner coat than the smaller size pistons.

In accordance with one aspect of this invention, a means for substantially uniformly sizing a plurality of pistons of different machined diameters can be accomplished. Apparatus can be provided to apply a different or same thickness of coating to either the skirt 12, land ring 13 or to both skirt 12 and land ring 13. One apparatus can apply one thickness, another apparatus a second thickness, and still another apparatus a third thickness. Any number of such apparatus for coating different thicknesses or the same thickness can be provided at different stations or stages. After measuring the size across the skirt 12 or land ring 13 of each piston, and preferably sorting them into groups, the defined areas of the pistons in each group having diameters within a selected range are coated by one or more coatings of a total thickness as calculated for each group. By applying a coating in one or more steps to each of the pistons of each group, the ultimate diameter range for all the pistons in each group can be reduced to reduce the clearance between such pistons and cylinder in which the pistons operate. It should be evident that any number of layers of coatings can be provided and any combination of the thicknesses of such layers can be utilized depending upon the measurement of the pistons and the cylinder diameter range.

It should be evident from the above description that I have described a unique means of sizing defined areas of a piston. Although the preferred apparatus for coating the piston is the tampon transfer apparatus and process, it should be understood that within the broader aspects of this invention, the basic concept of sizing by first measuring the piston and then coating the same with a desired thickness to achieve the desired diameter for each individual piston is a basic invention without restricting it to the preferred method and apparatus as described in this application. Therefore, changes and modifications in the specifically described embodiments can be carried out without departing from the principles of one basic aspect of the invention which is intended to be limited only by the scope of the appended claims as interpreted according to the principles of patent law, including the doctrine of equivalents.

The embodiments of the invention in which an exclusive property or privilege is claimed are defined as follows.

I claim:

1. A method of sizing a defined curved surface area of a number of pistons comprising the steps of:
    providing a number of pistons having defined areas with diameter sizes less than a predetermined diameter of the cylinder bores in which said pistons are intended to be operated;
    determining by measurement that said diameter sizes of said defined curved surface areas of said pistons are variable;
    selecting a number of diameter ranges in which the diameters of said defined surface areas fall;
    measuring said diameters of the defined curved surface areas of each of said defined areas of each piston to determine in which said selected ranges said measured diameter of each piston falls;
    providing a dry-film coating material; and
    coating said defined areas of said pistons with different controlled thicknesses of said dry-film coating material, the thickness of coating for each piston being selected to produce substantially the same overall total diameter size of said defined areas for all of said pistons.

2. The method of claim 1 in which the step of coating is accomplished by means of a transfer pad coating process.

3. The method of claim 2 in which said dry-film coating material is applied to the piston in a wetted state and is dried by applying heat thereto while on the piston.

4. The method of claim 1 in which several coats are applied to obtain the overall total diameter size of said defined areas.

5. The method of claim 3 in which the method of coating is by the transfer pad coating process which includes the steps of applying a controlled thickness of the wetted dry-film coating material to a curved matrix, said curved matrix having a configuration and size corresponding to the pattern of a curved surface area of said piston; and transferring at least some of said wetted dry-film coating material from said curved matrix to said curved surface area.

6. The method of claim 5 in which the transfer of said wetted dry-film coating material to said curved surface area is by a resilient tampon.

7. The method of claim 6 in which said tampon is cylindrical including the steps of rotating said tampon to pick up a controlled thickness of said wetted coating from said curved matrix and transferring a controlled thickness of said wetted coating to said curved surface area while said piston is rotating in timed sequence with the said rotation of said tampon.

8. The method of claim 7 in which said piston has a skirt comprising two defined curved surface areas diametrically opposite one from the other on said piston and said tampon rotates to pick up said wetted coating material from said curved matrix to transfer said wetted coating material to one of said defined curved surface areas; and repeating said step of applying wetted dry-film coating material to said matrix, after which said rotation of said tampon is repeated to transfer said wetted coating material to the other of said defined curved surface areas.

9. The method of claim 7 in which said piston has at least one ring groove with a top land ring above said groove, the defined curved surface area of said piston is said land ring and said tampon rotates to pick up said wetted coating from said curved matrix to continuously transfer said wetted coating to said land ring.

10. The method of claim 1 in which the defined area of said piston is a skirt.

11. The method of claim 1 in which the piston includes at least one ring groove with a top land ring above said groove and said land ring is the defined curved surface.

12. The method of claim 1 in which the piston includes a skin and at least one ring groove above said skin with a top land ring above said groove, said skin and land ring each comprising a defined area;

said skirt and land ring having different diameter sizes, said diameter sizes being less than a predetermined diameter of the cylinder bores in which said pistons are intended to be used; and simultaneous coating each of said skirt and land ring with a coating having a thickness whereby a total overall diameter size of said skirts are substantially the same and the total overall diameter size of said land rings are substantially the same.

13. The method of claim 7 in which the piston includes a skirt and at least one ring groove above said skirt with a top land ring above said groove, said skirt and land ring each comprising a defined area;

said skirt and land ring having different diameter sizes, said diameter sizes being less than a predetermined diameter of the cylinder bores in which said pistons are intended to be used; and simultaneous coating each of said skirt and land ring with a coating having a thickness whereby the total overall diameter size of said skirts are substantially the same and the total overall diameter size of said land rings are substantially the same.

14. A method of sizing a defined curved surface of a number of pistons comprising the steps of:

providing a number of pistons having defined areas with diameter sizes less than the diameter of cylinder bores in which said pistons are intended to be operated;

selecting at least first and second diameter ranges in which the diameters of said defined surface areas of said pistons fall;

measuring the diameter of said curved surfaces of said pistons and sorting the pistons into first and second groups, the first group having pistons with diameters falling into the first diameter range and the second group having pistons falling into the second diameter range;

determining the average difference between said range of diameters of the pistons of the first group of pistons and the selected first diameter range;

determining the average difference between the said range of diameters of the pistons of the second group of pistons and the selected second diameter range;

selecting a first coating thickness for the pistons in said first group from the determination of the average difference between the range of said diameters of said pistons in said first group and the said first selected diameter range;

selecting a second coating thickness for said second group of pistons from the determination of the difference between the range of said diameters of said pistons in said second group and said second selected diameter range;

providing a dry-film coating material;

coating each piston in the first group with said dry-film coating material of the first coating thickness as selected for the first group of pistons; and coating each piston in the second group with said dry-film coating of the second coating thickness as selected for the second group of pistons.

15. The method of claim 14 in which the steps of coating are accomplished by means of a transfer pad coating process.

16. The method of claim 15 in which the dry-film coating material is applied to the pistons in a wetted state and is dried by applying heat thereto while on the piston.

17. The method of claim 4 in which more than one coat is applied to the pistons in at least one of the first or second group.

18. The method of claim 17 in which the coating step is accomplished by means of a transfer pad coating process.

19. A method of sizing a defined curved surface area of a number of pistons comprising the steps of:

providing a number of pistons having defined areas with diameter sizes less than the diameter of the cylinder bores in which said pistons are intended to be operated;

determining by measurement that the diameter sizes of said defined curved surface areas of said pistons are variable;

selecting several diameter ranges in which the diameters of said defined surface areas fall;

measuring said diameter of the defined curved surface areas of each of said pistons and grouping them into subgroups, the diameters of the defined areas of each piston in each subgroup falling within one of said selected diameter ranges;

providing a dry-film coating material; and coating said defined areas of said pistons in each group with substantially the same controlled thickness of said dry-film coating material, the thickness of coating for each group being different and selected to produce substantially the same total overall diameter of said defined areas of all of the pistons in all the groups.

20. The method of claim 19 in which the coating step is accomplished by means of a transfer pad coating process.

* * * * *

UNITED STATES PATENT AND TRADEMARK OFFICE
CERTIFICATE OF CORRECTION

PATENT NO. : 5,435,873
DATED : July 25, 1995
INVENTOR : Thomas J. Penrice It is certified that error appears in the above-identified patent and that said Letters Patent is hereby corrected as shown below:

Column 3, line 18;
  "8A and 8F" should be --8A-8F--.

Column 5, line 8;
  After "matrix" delete --,--.

Column 5, line 56;
  After "piston" delete --,--.

Column 9, line 49, claim 12;
  "skin" should be --skirt--.

Column 9, line 50, claim 12;
  "skin" should be --skirt--. (Both Occur.)

Column 10, line 52, claim 17;
  "claim 4" should be --claim 14--.

Signed and Sealed this

Fourteenth Day of November, 1995

Attest:

BRUCE LEHMAN

*Attesting Officer*     *Commissioner of Patents and Trademarks*